US006477484B1

(12) United States Patent
Hachmeister

(10) Patent No.: US 6,477,484 B1
(45) Date of Patent: Nov. 5, 2002

(54) METHOD FOR DETERMINING THE LOAD OF A COMPUTING DEVICE

(75) Inventor: Marcel Hachmeister, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,272

(22) PCT Filed: Dec. 17, 1998

(86) PCT No.: PCT/DE98/03709
§ 371 (c)(1),
(2), (4) Date: Jun. 23, 2000

(87) PCT Pub. No.: WO99/34292
PCT Pub. Date: Jul. 8, 1999

(30) Foreign Application Priority Data

Dec. 24, 1997 (DE) .......................................... 197 57 876

(51) Int. Cl.⁷ ................................................ G06F 9/44
(52) U.S. Cl. ...................... 702/186; 702/108; 702/123; 702/182; 702/177
(58) Field of Search ................................ 702/108, 119, 702/123, 182–185, 186, 187, 188, 177, 178, FOR 103, FOR 104, FOR 134, FOR 135, FOR 170, FOR 171, FOR 154; 713/502, 323; 714/38; 709/102, 105

(56) References Cited

U.S. PATENT DOCUMENTS

| | | | | |
|---|---|---|---|---|
| 4,126,895 A | * | 11/1978 | Weemaes et al. ............ 340/200 |
| 5,072,376 A | * | 12/1991 | Ellsworth ................... 395/650 |
| 5,212,793 A | * | 5/1993 | Donica et al. ............... 395/700 |
| 5,276,898 A | * | 1/1994 | Kiel et la. .................. 395/800 |
| 5,689,691 A | * | 11/1997 | Mann ......................... 395/557 |
| 5,740,045 A | * | 4/1998 | Livshiz et al. ......... 364/431.03 |
| 5,978,830 A | * | 11/1999 | Nakaya et al. .............. 709/102 |
| 5,995,997 A | * | 11/1999 | Horvitz ...................... 709/102 |
| 6,009,452 A | * | 12/1999 | Horvitz ...................... 709/102 |
| 6,018,803 A | * | 1/2000 | Kardach ..................... 713/323 |
| 6,212,544 B1 | * | 4/2001 | Borkenhagen et al. ...... 709/103 |

FOREIGN PATENT DOCUMENTS

| JP | 60 237550 | 11/1985 |
|---|---|---|
| JP | 63 016306 | 1/1988 |
| JP | 06 035727 | 2/1994 |

OTHER PUBLICATIONS

"Prioritization of Smalltalk Garbage Collection Based on System Activity" IBM Technical Disclosure Bulletin, vol. 37, No. 3, Mar. 1994, pp. 609/610.

* cited by examiner

Primary Examiner—Marc S. Hoff
Assistant Examiner—Carol S Tsai
(74) Attorney, Agent, or Firm—Walter Ottesen

(57) ABSTRACT

A method for determining the utilization of a computing apparatus is described, especially for the determination of the utilization of a microcomputer having a real-time operating system. In the method, an idle program (2) is always then called up when no other programs are processed by the control apparatus. According to the invention, the number (ZMESS) of the call-ups of the idle program (2) or the total duration of the idle program (2) is determined. This number (ZMESS) is evaluated after a pregiven reference time span (TMAX) is exceeded. The number (ZMESS) of call-ups of the idle program (2) can be applied as a measure for the utilization of the computing apparatus.

8 Claims, 1 Drawing Sheet

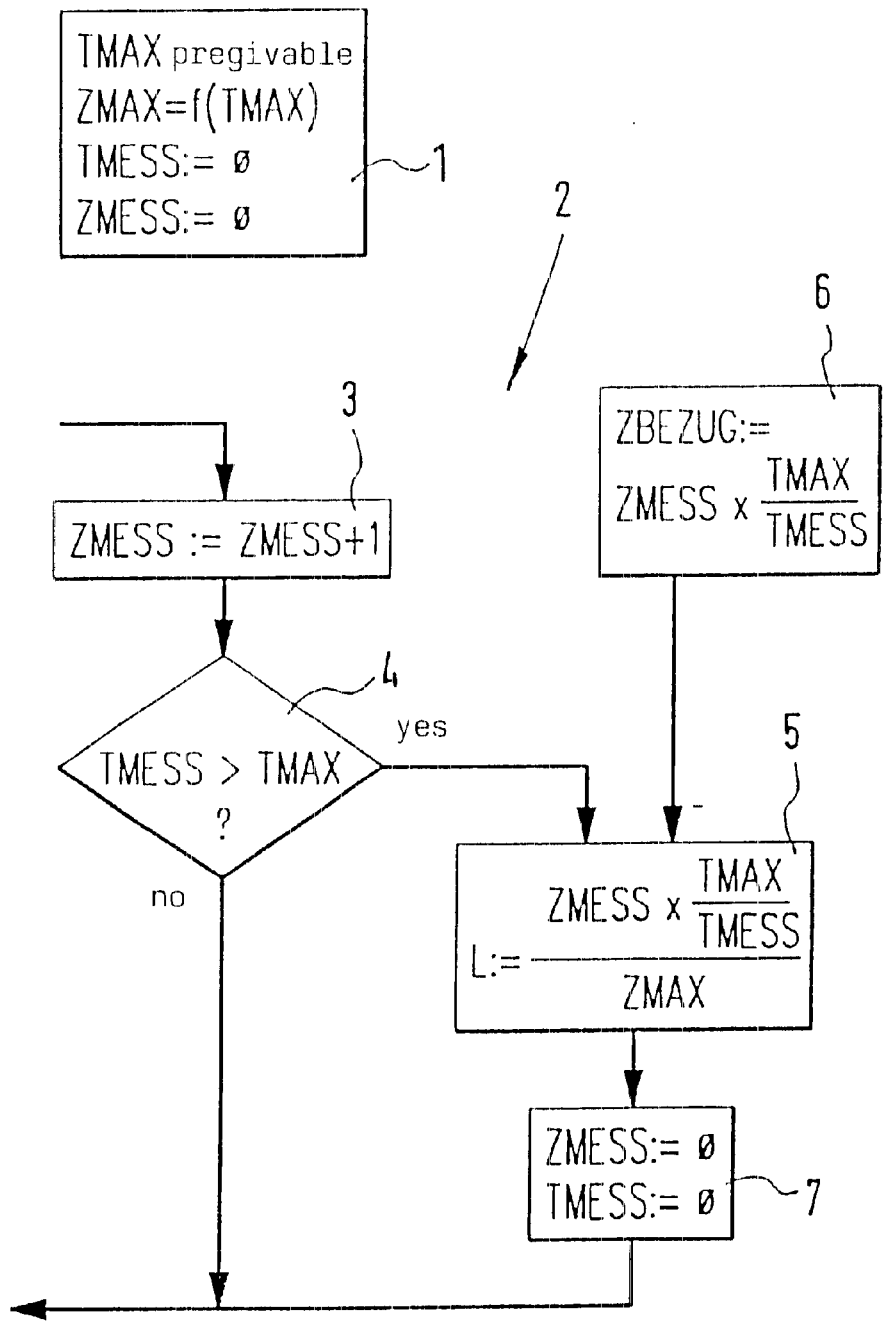

METHOD FOR DETERMINING THE LOAD OF A COMPUTING DEVICE

FIELD OF THE INVENTION

The invention relates to a method for determining the utilization or work load of a computing apparatus, especially of a microcomputer having a real-time operating system. In the method, an idle program is always then called up when no other programs are any longer processed by the computing apparatus.

BACKGROUND OF THE INVENTION

For a plurality of applications, it is often necessary to determine the utilization of a computing apparatus in real time. If, for example, the computing apparatus is a microcomputer which is accommodated in a control apparatus for an internal combustion engine and, which control apparatus, inter alia, open loop controls and/or closed loop controls the injection of fuel and/or the ignition of the fuel in the engine, then the utilization of the microcomputer is especially dependent upon the rpm of the engine. At high rpm, the microcomputer must more frequently determine the fuel mass to be injected and the ignition time point than, for example, during the idle of the engine.

The computation of the fuel mass, the ignition time point and, if needed, other operating characteristic variables of the engine, takes place in dependence upon input quantities which are measured with the aid of sensors and are supplied to the microcomputer. Especially the measurement of the input quantities takes place at specific pregiven time points or with the aid of so-called interrupts. As a rule, the microcomputer is equipped with a real-time operating system for processing such tasks.

When no computations have to be carried out by the control apparatus because of the given operating conditions of the engine, then this has the consequence that the microcomputer processes an idle program. The duration of the idle program is held as short as possible so that, as required, again one of the actual programs can be processed as quickly as possible. When none of the actual programs are pending for processing, then the idle program is called up anew.

As already mentioned, the utilization of the microcomputer is very dependent upon the engine speed (rpm) of the engine. Here, it is possible that, for a high rpm or for a plurality of pending computations, the microcomputer is no longer in a position to promptly execute all computations. Accordingly, it is possible that the microcomputer, for example, cannot compute rapidly enough the ignition time point for the ignition of the injected fuel so that this ignition time point can only then be made available by the microcomputer when the fuel already should have been ignited.

An overload of the computer of this kind therefore leads to a malfunction in the injection or ignition of the fuel in the engine. This can be prevented in that the utilization of the computing apparatus is monitored and is influenced such that an overload virtually cannot take place.

SUMMARY OF THE INVENTION

It is the object of the invention to provide a method for determining the utilization of a computing apparatus with which a monitoring of the computing apparatus can take place with the greatest possible accuracy.

This task is solved with a method of the above-mentioned kind in accordance with the invention in that the number of the call-ups of the idle program or the total duration of the idle program is determined and is evaluated after exceeding a pregiven reference time span.

The number of call-ups of the idle program during the reference time span defines a measure for the utilization of the computing apparatus. The more often the idle program is called up, the lower is the utilization of the computing apparatus. Conversely, the utilization of the computing apparatus is high when the idle program is called up only infrequently during the reference time span. A conclusion can be drawn as to the utilization of the computing apparatus from the determination of the number of call-ups of the idle program during the reference time span.

Correspondingly, it is possible to draw a conclusion as to the utilization of the computing apparatus from the total duration of the idle program during the reference time span. The longer the total duration of the idle program is, the lower is the utilization of the computing apparatus. Conversely, the utilization of the computing apparatus is high when the total duration of the idle program is short during the reference time span.

When the number of call-ups of the idle program is determined during the reference time span, then an especially advantageous configuration of the invention is that the number of call-ups of the idle program is incremented with a call-up of the idle program. The idle program itself therefore counts the number of its own call-ups. This affords the advantage that the other programs of the computing apparatus are not burdened by the method of the invention. The execution of the method according to the invention takes place during the idle program when the computing apparatus does not have to execute any other task whatsoever.

In an advantageous embodiment of the invention and after a call-up of the idle program, the latter checks whether the reference time span is exceeded. Thus, the monitoring of the reference time span is also carried out by the idle program itself. This affords the advantage that the other programs also are not loaded with reference to the above by the method of the invention. The monitoring of the reference time span can, for example, be executed by the idle program in that the actual time at the start of the reference time span is stored and thereafter, the difference between the later actual time and the stored actual time is determined.

In a further advantageous embodiment of the invention, after the reference time is exceeded, the actual number of call-ups is referred to the actual measuring time duration. When it is determined by the idle program that the reference time span is exceeded, then it is possible that the reference time span is already very significantly exceeded. If the actual number would be applied directly to the determination of the utilization of the computing apparatus, this would lead to a certain error. This is prevented in accordance with the invention in that the actual number of call-ups is first referred to the actual measurement time duration. Thus, the actual number of call-ups is considered in such a manner that a possible exceeding of the reference time span makes no difference.

In an advantageous embodiment of the invention, the actual number of call-ups is referred to a maximum possible number of call-ups after an exceeding of the reference time span. This maximum number of possible call-ups is dependent upon the reference time span and the program running time of the idle program. The program running time must be determined in advance of taking the computing apparatus into service. With the aid of the maximum possible number of call-ups in the reference time span, it is thereby possible to indicate the utilization of the computing apparatus as a relative quantity.

It is especially advantageous when, after the reference time span is exceeded, the number of call-ups is reset and the reference time span is started anew. In this way, the preconditions are provided to execute a new determination of the utilization of the computing apparatus.

The described determination according to the invention of the utilization of the computing apparatus can be utilized especially advantageously when the idle program continues to run until one of the other programs is again present for processing. In this case, the idle program is not a cyclically running program but a program which is only ended by an interrupt which is triggered by one of the other programs.

Further features, possibilities of application and advantages of the invention become evident from the following description of embodiments of the invention which are shown in the drawing. All described or illustrated features by themselves or in any desired combination define the subject matter of the invention independently of their combination in the patent claims or their dependency as well as independently of their formulation or illustration in the description or in the drawing.

BRIEF DESCRIPTION OF THE DRAWINGS

The single figure of the drawing shows a schematic sequence diagram of an embodiment of the method of the invention for determining the utilization of a computing apparatus. This embodiment is described below together with a control apparatus for an internal combustion engine. However, it is expressly noted that the described method is not limited to this application; instead, the method can be utilized in any desired other applications.

DESCRIPTION OF THE PREFERRED EMBODIMENTS OF THE INVENTION

A control apparatus of an internal combustion engine is provided, for example, to determine the fuel mass to be injected and the ignition time point for the ignition of the fuel and, in dependence thereon, to control the injection valve and the spark plug of the engine. The computation of the fuel mass to be injected as well as the ignition time point are dependent upon the rpm of the engine. Especially at high rpms, the computation must take place so rapidly that the drive of the spark plug takes place in each case at the computed time point.

Because of a high utilization or loading of the control apparatus, it is possible that the above-mentioned computations cannot take place at the right time so that, for example, the computed ignition time point is only made available by the control apparatus at a time point when the ignition of the fuel already should have taken place.

So that this is avoided, it is necessary to determine the utilization of the control apparatus in order to, for a high utilization, influence the computations, which are to be carried out by the control apparatus, in such a manner that the above-described malfunctions do not occur.

The control apparatus of the engine is provided with a microcomputer which is operated by means of a real-time operating system. This means that, in the control apparatus, a plurality of programs is present which are always precisely then processed by the microcomputer when a corresponding program call-up from the operating system or an interrupt associated therewith is present.

For example, the ignition time point for driving the spark plug is always precisely then computed when the crankshaft of the engine triggers an interrupt in the microcomputer at a pregiven angular position.

When none of the programs, which are required for the open-loop and/or closed-loop control of the engine, are being instantaneously processed, then an idle program is processed by the microcomputer. This idle program then runs cyclically until one of the other programs again has to be processed. The idle program usually has no task and serves only to realize the idle of the microcomputer.

The above-mentioned idle program is applied for determining the utilization of the microcomputer. For this purpose, a reference time span TMAX is pregiven. If the reference time span TMAX is selected small, then this supplies a detailed information as to the utilization of the microcomputer. Even small peak loads of the microcomputer can be determined and recognized with a small reference time span TMAX. An average reference time span TMAX supplies essentially good information as to the utilization of the computer. However, it is possible that during an average time span TMAX, under circumstances, short-term overloads of the microcomputer already occur which cannot be detected. If the reference time span TMAX is selected large, then a long-term average value for the utilization of the computer results therefrom. Overloads of the microcomputer are, however, not reliably detected.

Furthermore, a maximum possible number ZMAX is determined which indicates how many call-ups of the idle program would be maximally possible during the reference time span TMAX. The maximum possible number ZMAX is a theoretical value which is dependent from the reference time span TMAX and which is initially determined from the running time TLAUF of the idle program via tests or the like in accordance with ZMAX=TMAX/TLAUF.

Finally, an actual measurement time duration TMESS is reset to zero as well as an actual number ZMESS of the call-ups of the idle program is likewise set to zero. The measurement time duration TMESS is that time duration during which, for the operation of the microcomputer, the number ZMESS of call-ups of the idle program has already been counted.

The above-mentioned adjustments or inputs are undertaken by the idle program, for example, in the initialization of the microcomputer, that is, in advance of the first runthrough of the microcomputer. The above-mentioned adjustments or inputs are contained in a block 1 in the FIGURE.

If, in the normal operating state of the microcomputer, none of the programs are active which control (open-loop and/or closed-loop) the engine, then the idle program is started and run through. A part of the idle program is shown in the FIG. and is characterized by the reference numeral 2.

During the running of the idle program, a number ZMESS of call-ups of the idle program is incremented. This is shown in block 3 with the equation:

ZMESS:=ZMESS+1.

Thereafter, a decision is made in lozenge 4 of the FIG. as to whether the actual measuring time duration TMESS is greater than the reference time span TMAX. Accordingly, a check is made as to whether TMESS>TMAX.

If this is not the case, then the idle program is continued as usual.

If, in contrast, this is the case, that is, the reference time span TMAX is exceeded, then the utilization of the microcomputer is determined in a block 5. For this purpose, first the portion of call-ups is computed in block 6 which applies to the reference time span TMAX: ZBEZUG=ZMESS×(TMAX/TMESS). This portion is then referred to the number ZMAX of the maximum possible call-ups of the idle program within the reference time TMAX.

In total, there results from the above a computation of the utilization of the microcomputer in block 5 in accordance with the equation:

$$L:=(ZMESS \times (TMAX/TMESS))/ZMAX.$$

Furthermore, it is thereby possible to present the utilization of the microcomputer by the actual programs of the control apparatus in accordance with the following equation in percent:
$L(\text{in } \%):=100\%-100\% \times L.$ In a next block 7, the measuring time duration TMESS and the number ZMESS of the call-ups of the idle program are again set to zero. Thereafter, the idle program is continued as usual.

In dependence upon the utilization of the microcomputer, which is determined in this manner, measures can be taken to avoid malfunctions at high work loads. Accordingly, it is possible to permit execution only of those programs by the microcomputer at high work loads thereof which are absolutely necessary for the control (open-loop and/or closed-loop) of the engine. All other programs, which are not absolutely necessary, can then be suppressed during such a high utilization of the microcomputer.

What is claimed is:

1. A method for determining the utilization of a computing apparatus, including a microcomputer having a real-time operating system, the method comprising the steps of:

calling up an idle program when no other programs are any longer processed by the computing apparatus;

determining the number (ZMESS) of the call-ups of the idle program;

determining the total running time of the idle program;

evaluating one of the following:
(a) the number of call-ups of said idle program; or,
(b) the total duration of said idle program after a pregiven reference time span (TMAX) is exceeded; and, after said reference time span (TMAX) is exceeded, referring the actual number (ZMESS) of call-ups to the actual measurement time duration (TMESS).

2. The method of claim 1, wherein, for a call-up of the idle program, the number (ZMESS) of the call-ups is incremented by the idle program.

3. The method of claim 1, wherein, after a call-up of the idle program, a check is made by the idle program itself as to whether the reference time span (TMAX) is exceeded.

4. The method of claim 1, wherein the actual number (ZBEZUG) of call-ups is referred to a maximum possible number (ZMAX) of call-ups after the reference time span (TMAX) is exceeded.

5. The method of claim 1, wherein the number (ZMESS) of call-ups is reset and the reference time span (TMAX) is started anew after the reference time span (TMAX) is exceeded.

6. The method of claim 1, wherein the idle program continues to run until one of the other programs is again pending for processing.

7. The method of claim 1, wherein the duration of the idle program or background program is referred to a maximum possible running duration after the reference time span is exceeded.

8. The method of claim 7, wherein the idle program or background program is run through and started anew until one of the other programs is again pending for processing.

* * * * *